(12) United States Patent
Mak et al.

(10) Patent No.: US 7,635,408 B2
(45) Date of Patent: Dec. 22, 2009

(54) METHODS AND CONFIGURATIONS FOR ACID GAS ENRICHMENT

(75) Inventors: John Mak, Santa Ana, CA (US); Richard B. Nielsen, Laguna Niguel, CA (US); Thomas King Chow, Villa Park, CA (US); Oliver Morgan, Huntington Beach, CA (US); Vincent Wai Wong, Hacienda Heights, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 329 days.

(21) Appl. No.: 10/585,271

(22) PCT Filed: Aug. 18, 2004

(86) PCT No.: PCT/US2004/026926

§ 371 (c)(1),
(2), (4) Date: May 1, 2007

(87) PCT Pub. No.: WO2005/075056

PCT Pub. Date: Aug. 18, 2005

(65) Prior Publication Data

US 2008/0019899 A1    Jan. 24, 2008

Related U.S. Application Data

(60) Provisional application No. 60/538,122, filed on Jan. 20, 2004, provisional application No. 60/538,105, filed on Jan. 20, 2004, provisional application No. 60/538,608, filed on Jan. 22, 2004, provisional application No. 60/565,053, filed on Apr. 22, 2004.

(51) Int. Cl.
*B01D 53/14* (2006.01)
(52) U.S. Cl. .............................. 95/187; 95/223; 95/235; 96/234; 423/220; 208/208 R
(58) Field of Classification Search ................... 96/234; 95/187, 188, 206–209, 223, 235; 423/220, 423/228, 229; 208/208 R
See application file for complete search history.

(56) References Cited

U.S. PATENT DOCUMENTS

| | | | |
|---|---|---|---|
| 3,877,893 A * | 4/1975 | Sweny et al. | 95/162 |
| 4,093,701 A | 6/1978 | Butwell | |
| 4,198,386 A | 4/1980 | Laslo et al. | |
| 4,278,621 A | 7/1981 | Sigmund et al. | |
| 4,297,329 A | 10/1981 | Sigmund et al. | |
| 4,356,161 A | 10/1982 | McNamara et al. | |
| 4,504,449 A * | 3/1985 | Doerges et al. | 423/228 |
| 4,678,648 A | 7/1987 | Wynn | |
| 5,273,679 A * | 12/1993 | Hihara et al. | 95/177 |
| 5,716,587 A | 2/1998 | Khanmamedov | |
| 5,782,958 A * | 7/1998 | Rojey et al. | 95/192 |
| 2002/0104438 A1 * | 8/2002 | Cadours et al. | 95/235 |

* cited by examiner

*Primary Examiner*—Frank M Lawrence
(74) *Attorney, Agent, or Firm*—Fish & Associates, PC

(57) ABSTRACT

Hydrogen sulfide is selectively enriched from an acid gas (1) that comprises relatively large quantities of carbon dioxide using a configuration in which a portion of an isolated hydrogen sulfide stream is introduced into an absorber (51) operating as a carbon dioxide rejecter. The resulting concentrated hydrogen sulfide enriched solvent (4) is then further used (directly or indirectly) to absorb hydrogen sulfide from an acid feed gas.

14 Claims, 7 Drawing Sheets ved via selective absorption of hydrogen sulfide from the
METHODS AND CONFIGURATIONS FOR ACID GAS ENRICHMENT This application claims priority to our commonly owned and copending U.S. provisional patent applications with the Ser. Nos. 60/538,105 (filed 20 Jan. 2004), 60/538,122 (filed 20 Jan. 2004), 60/538,608 (filed 22 Jan. 2004), and 60/565,053 (filed 22 Apr. 2004), each of which is incorporated by reference herein.

FIELD OF THE INVENTION

The field of the invention is gas processing and sulfur removal, especially as it relates to enrichment of an acid gas stream with high carbon dioxide content and a tail gas from Claus plant.

BACKGROUND OF THE INVENTION

There are numerous sources of natural or synthetic gases known in the art, and almost all of them contain hydrogen sulfide in various quantities that require at least partial desulfurization prior to further processing or release into the atmosphere. For example, natural gas, refinery gas, synthesis gas (e.g., from gasification of residual oil or coke), or Fischer-Tropsch gas-to-liquids process gases often contain hydrogen sulfide in significant amounts that would interfere with downstream processes. In another example, the sulfur content in the tail gas from Claus reactors typically necessitates treatment before venting the tail gas into the atmosphere.

If hydrogen sulfide is present in relatively large quantities, sulfur removal is commonly accomplished by absorption in an alkaline amine solvent. The so absorbed hydrogen sulfide is desorbed in a regenerator or stripper that operates at a lower pressure and elevated temperature. The acid gas from the regenerator or stripper is then often processed in a Claus plant where the hydrogen sulfide is converted to elemental sulfur by sub-stoichiometric reaction with air or oxygen.

However, nearly all gas streams that contain hydrogen sulfide also contain significant quantities of carbon dioxide, and when such gases are scrubbed with an alkaline solution, carbon dioxide is co-absorbed with the hydrogen sulfide. Co-absorption is particularly problematic where the ratio of carbon dioxide to hydrogen sulfide in the gas stream is relatively high, as such removal will often produce an acid gas with a relatively low concentration of hydrogen sulfide, which tends to cause various problems in the Claus plant. Among other things, dilution of hydrogen sulfide with relatively large quantities of carbon dioxide lowers the net heating value in the acid gas, thereby reducing the residence time in the Claus furnace, which in turn renders sulfur conversion difficult. Moreover, such acid gases typically contain significant quantities of contaminants (e.g., benzene, toluene, xylene and heavy hydrocarbons) that must be destroyed in the Claus furnace to protect the downstream Claus reactor catalyst. However, relatively high carbon dioxide concentrations tend to lower the furnace flame temperature, thereby often making thermal destruction of these contaminants difficult. Moreover, a relatively high carbon dioxide concentration increases the size of Claus plant components as the configuration of a Claus plant is predominantly controlled by the total volumetric flow of acid gas.

In some cases, where the hydrogen sulfide content in the acid gas is below 10%, the Claus process often becomes ineffective and additional and costly processing steps must be employed to enhance the conversion (e.g., using an oxygen or oxygen enriched process). Where the acid gas is entirely unsuitable as a feed to a Claus plant, preprocessing using a selective acid gas removal process is frequently necessary. In a typical preprocessing operation, two gas streams are produced via selective absorption of hydrogen sulfide from the acid gas and subsequent stripping of the rich solvent. Thus, one gas stream predominantly will comprise carbon dioxide and ppmv levels of hydrogen sulfide (suitable for combustion and/or discharge). The other gas stream is enriched in hydrogen sulfide and is processed in a Claus plant using highly reactive catalysts and/or a tail gas treatment unit to meet current emission standards.

Currently known processes for selective removal of hydrogen sulfide from gases with relatively high carbon dioxide concentration include the Stretford, LOCAT, and/or Sulferox processes, which typically employ complex catalyst-based chemistry to directly oxidize hydrogen sulfide to sulfur. However, these units are often complex, difficult to operate, and limited to relatively small capacity. Alternatively, amine based solvents with selectivity towards hydrogen sulfide can be used. For example, selective absorption processes can be based on variations of tertiary amines (e.g., those comprising formulated methyldiethanol-amine (MDEA), sterically hindered tertiary amines, and other amine-organic solvent blends). Such solvents, particularly when combined with special absorber internal designs will minimize co-absorption of carbon dioxide while concentrating hydrogen sulfide three to five fold.

In still further attempts to increase selectivity of absorption, certain tray configurations can be employed to reduce the contact time of the solvent with carbon dioxide (relative to that with hydrogen sulfide) to achieve the desired selectivity (see e.g., U.S. Pat. Nos. 4,278,621, 4,297,329, and 4,678,648). Unfortunately, the use of such processes and/or devices in most cases is not effective and produces only insignificant economic benefit for treating a diluted acid gas stream. Alternatively, as exemplified in U.S. Pat. No. 5,716,587, selectivity is achieved by combining a portion of the contaminants or acid gases from the solvent regenerator to the feed gas to increase the partial pressure of the contaminants at the absorber. While this configuration will marginally increase the concentration of hydrogen sulfide in the resultant acid gas, mixing of two different gases (i.e., the feed gas and the recycled acid gas) having varying hydrogen sulfide concentrations will typically result in a loss of efficiency. Moreover, the use of a single absorber in treating the combined gas requires a high solvent circulation, adding to the cost-ineffectiveness of such configurations.

Alternatively, as described in U.S. Pat. Nos. 4,198,386 and 4,093,701, selectivity is achieved by varying gas flow-rates using a plurality of absorption columns, and splitting the absorber column into a number of absorption zones with controlled flow-rates of lean amine solvent. However, such systems are often costly to install and complicated to operate. In yet further attempts to increase selectivity, hydrogen sulfide absorption may be enhanced via temperature control. Generally, a reduction in absorption temperature slows the carbon dioxide absorption rate. However, the cost and complexity of operating a refrigeration unit renders such an option often uneconomical.

Even where selective acid gas absorption using concurrent conversion of hydrogen sulfide to elemental sulfur in a Claus plant is employed, residual sulfur content in the Claus plant tail gas often poses additional problems. Among other things, the Claus plant tail gas frequently contains substantial quantities of hydrogen sulfide and therefore fails to meet the environmental emission standards for discharging into the atmosphere. There are various configurations known in the art to reduce the sulfur content of a Claus plant tail gas. However, most the known configurations are relatively complex and expensive to operate.

Therefore, and especially where a diluted acid gas feed is encountered, currently known methods and configurations are often neither suitable nor economical. Consequently, there is still a need to provide improved configurations and methods for selective acid gas enrichment.

SUMMARY OF THE INVENTION

The present invention is directed to configurations and methods of selective hydrogen sulfide absorption from various gases comprising hydrogen sulfide and carbon dioxide, and especially from gases in which hydrogen sulfide is diluted (e.g., less than 10%).

More specifically, the inventors have discovered that use of a second absorber that receives a portion of the isolated hydrogen sulfide, and optionally recycling of the semi-rich amine from the first absorber to the second absorber significantly increases hydrogen sulfide concentration in the isolated hydrogen sulfide. Viewed from another perspective, additional removal of carbon dioxide from the portion of the isolated hydrogen sulfide in a second absorber (and optionally from the Claus tail gas in a third absorber) will concentrate the hydrogen sulfide relative to the carbon dioxide, and thus reduce equipment size and solvent circulation.

In one aspect of the inventive subject matter, a plant has a first absorber fluidly coupled to a regenerator, wherein the first absorber is configured to promote absorption of hydrogen sulfide by a hydrogen sulfide-selective solvent, and wherein the regenerator is configured to promote formation of a hydrogen sulfide-rich gas from the hydrogen sulfide-selective solvent. A second absorber is fluidly coupled to the regenerator, wherein a portion of the hydrogen sulfide-rich gas is fed to the second absorber to thereby increase the hydrogen sulfide concentration in the hydrogen sulfide-rich gas, wherein the first and second absorbers are configured to produce an overhead product that is enriched in carbon dioxide and substantially depleted in hydrogen sulfide.

Depending on the particular configuration, the first and second absorbers produce a first and second hydrogen sulfide-enriched solvent, respectively, that may be combined before they enter a regenerator. Additionally, a portion of the hydrogen sulfide-enriched solvent from the first absorber may also be fed to the second absorber, or the first and second hydrogen sulfide-enriched solvents are combined in the second absorber.

In especially contemplated aspects of the inventive subject matter, the plant will further include a sulfur plant (e.g., Claus plant) in which hydrogen sulfide is at least partially converted to elemental sulfur. Preferably, the tail gas of the sulfur plant is fed to a third absorber that produces an overhead product that is enriched in carbon dioxide and substantially depleted in hydrogen sulfide, and a third hydrogen sulfide-enriched solvent. The so produced third hydrogen sulfide-enriched solvent may then be fed to the first and/or second absorber.

Alternatively, it is contemplated that the second absorber and the third absorber may also be combined in at least some respects. Such plants will then include a first absorber fluidly coupled to a regenerator, wherein the first absorber is configured to promote absorption of hydrogen sulfide by a hydrogen sulfide-selective solvent, and wherein the regenerator is configured to promote formation of a hydrogen sulfide-rich gas from the hydrogen sulfide-selective solvent. A second absorber is fluidly coupled to the regenerator, wherein a portion of the hydrogen sulfide-rich gas is fed to the first absorber to thereby increase the hydrogen sulfide concentration in the hydrogen sulfide-rich gas from the regenerator, and a Claus plant that receives another portion of the hydrogen sulfide-rich gas and produces a tail gas, wherein the second absorber is configured to receive the tail gas, wherein the first and second absorbers are configured to produce an overhead product that is enriched in carbon dioxide and substantially depleted in hydrogen sulfide. Preferably, the second absorber in such plants is configured to produce a hydrogen sulfide-enriched solvent, wherein at least a portion of the hydrogen sulfide-enriched solvent is fed to the first absorber.

Consequently, a method of increasing the concentration of hydrogen sulfide in a gas stream may include a step in which an acid gas stream is separated in a first absorber to form a first carbon dioxide-rich gas and a first hydrogen sulfide-enriched solvent using a hydrogen sulfide-selective solvent. In another step, a first portion of a hydrogen sulfide-rich product gas is separated in a second absorber to form a second carbon dioxide-rich gas and a second hydrogen sulfide-enriched solvent. In yet another step, the first and second hydrogen sulfide-enriched solvents are combined, and in a still further step, hydrogen sulfide is removed from the first and second hydrogen sulfide-enriched solvents to thereby form the hydrogen sulfide-rich product gas from the solvent regenerator.

In especially preferred methods, the step of combining the first and second hydrogen sulfide-enriched solvents comprises mixing of the first and second hydrogen sulfide-enriched solvents (which may be performed by feeding at least part of the first hydrogen sulfide-enriched solvent into the second absorber).

Moreover, it should be recognized that a second portion of the hydrogen sulfide-rich product gas from the solvent regenerator in contemplated methods may be fed to a Claus plant. In such methods, the Claus tail gas may be fed to a third absorber that produces a third overhead product enriched in carbon dioxide and substantially depleted in hydrogen sulfide, and a third hydrogen sulfide-enriched solvent (which may be fed to the first and/or second absorber).

Various objects, features, aspects and advantages of the present invention will become more apparent from the following detailed description of preferred embodiments of the invention along with the accompanying drawing.

DETAILED DESCRIPTION

Figure 1:
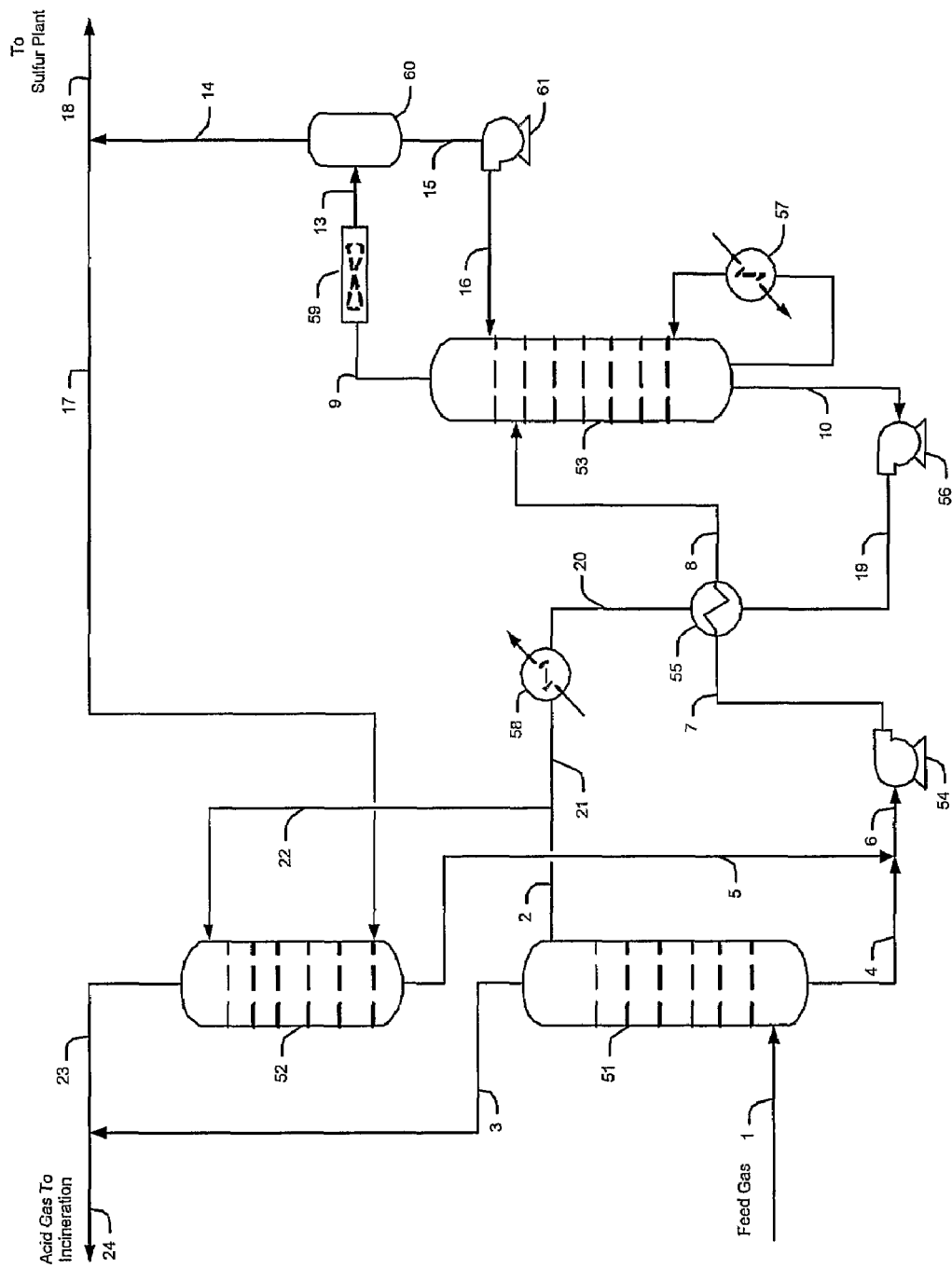
FIG. 1 is a first exemplary configuration for hydrogen sulfide enrichment from an acid gas comprising substantial quantities of carbon dioxide.

The inventors generally contemplate configurations and methods of selective hydrogen sulfide absorption and sulfur recovery from various gases comprising hydrogen sulfide and carbon dioxide, and especially from gases in which hydrogen sulfide is diluted. Contemplated configurations may also include an integrated sulfur plant (e.g., Claus plant) that receives a portion of an hydrogen sulfide-rich gas and that provides a tail gas to the plant from which the hydrogen sulfide is reabsorbed by a solvent while the carbon dioxide and other contaminants are rejected.

Most preferably, solvents used in conjunction with the teachings presented herein are selective towards hydrogen sulfide, and most preferably include tertiary amines, activated amines, sterically hindered amines, and/or complex amines. There are numerous such solvents known in the art, and all of the known hydrogen selective solvents are deemed suitable for use herein.

Contemplated configurations are particularly advantageous where the gas to be treated has a relatively low hydrogen sulfide concentration while having a relatively high carbon dioxide concentration. For example, a gas stream that is treated using contemplated configurations and processes will typically have 20% or less hydrogen sulfide, more typically 15% or less hydrogen sulfide, even more typically 10% or less hydrogen sulfide, and most typically 7% or less hydrogen sulfide. With respect to the carbon dioxide concentration, it is generally contemplated that such gases have at 80% or more carbon dioxide, more typically 85% or more carbon dioxide, even more typically 90% or more carbon dioxide, and most typically 93% or more carbon dioxide. Therefore, suitable gas streams include acid gases from various processes, including natural gas processing, hydrocarbon refining processes, gasification of residual oil or coke, coking operations, gas treating unit operations, etc.

Depending on the source of the acid gas stream, it should be recognized that the hydrogen sulfide concentration in the stream to be treated may not be suitable for the Claus process (i.e., too low) and/or that the acid gas stream may further include other components, BTEX (benzene, toluene, ethylbenzene, and xylene), including heavy hydrocarbons, and/or carbon dioxide at relatively high concentration which may interfere with the downstream Claus catalysts. Therefore, such acid gases presented heretofore a substantial problem in use and/or disposal.

Contemplated Plants without Sulfur Plant Integration

In one aspect of the inventive subject matter, the inventors contemplate a configuration in which hydrogen sulfide is selectively removed from acid gas with relatively high concentrations of carbon dioxide (typically at least 75%, more typically at least 80%) using a second absorber operating as a carbon dioxide rejection column that receives a portion of a hydrogen sulfide-rich stream generated by the regenerator. It should be recognized that the second absorber separately treats the hydrogen sulfide-rich recycle stream and consequently retains the advantage of the high partial pressure of the hydrogen sulfide in the solvent. The second absorber may be integrated in numerous manners, and various integration schemes are provided below. Among other things, it is contemplated that the rich solvent from the second absorber may be used downstream alone or in combination with a hydrogen sulfide enriched solvent from the first absorber.

One exemplary configuration in which the hydrogen sulfide enriched solvents from the first and second absorbers are combined and wherein the combined solvents are fed into and regenerated by the regenerator is depicted in FIG. 1. Here, the feed gas is a diluted hydrogen sulfide acid gas stream from a gas treating unit at a flow rate of 50 MMscfd having a gas composition of 6% hydrogen sulfide, 92% carbon dioxide and 1.0% C1, 0.7% C2+ hydrocarbons, and 3000 ppm BTEX.

The feed gas stream 1 enters the unit at 120° F. and 10 psig and is scrubbed in the first amine absorber 51 with a lean amine stream 2. In order to meet the emission requirement, the hydrogen sulfide content in the overhead stream 3 is typically less than 150 ppmv (preferably less than 120 ppmv, more preferably less than 100 ppmv, and most preferably less than 75 ppmv), which can be achieved by using about 1800 GPM lean amine. The carbon dioxide in stream 3 is typically enriched and will preferably be higher than the carbon dioxide content in stream 1, more preferably at least 10% absolute higher, and most preferably at least 20% absolute higher. The lean solvent typically includes 40% to 50% MDEA, although other solvents such as DIPA, hindered amine, or other formulated tertiary amines can be used. The amine absorber 51 typically includes approximately 12 to 18 trays as needed to achieve the required hydrogen sulfide removal efficiency. Depending on the gas composition solvent flow rate, and other parameters, at least 75%, more typically at least 85%, and most typically at least 95% of the feed gas carbon dioxide is rejected to the overhead vapor in stream 3. The rich solvent stream 4 exits the bottom of the first absorber typically at 150° F. to 180° F.

The rich solvent stream 4 is combined with the rich solvent stream 5 from the second absorber 52 forming stream 6, and the mixture is pumped by the rich solvent pump 54 forming stream 7. Stream 7 is heated with a lean/rich exchanger 55 using the heat content of the lean solvent from the regenerator 53. The rich solvent is heated to about 210° F. forming stream 8 and enters the top of regenerator 53.

Regenerator 53 uses typically 20 stripping trays (or other number as appropriate) and a wash section for desorbing the acid gas. Alternatively, other contacting devices such as packing can be used. The acid gas in the rich solvent is stripped with heat applied at the bottom reboiler 57, producing an overhead stream 9 and a lean solvent stream 10. The lean solvent typically at 260° F. is pumped by lean solvent pump 56 to about 50 psig forming stream 19, and the heat content of which is recovered in the lean/rich exchanger. The lean solvent stream 20 is further cooled with a cooler 58 to typically 100-110° F., forming stream 21. Ambient air, cooling water or chilled water system can be used for cooling.

It is generally preferred that the cooler outlet temperature should be kept as low as possible (most preferably 60° F. to 80° F.) since the lower temperature favors the equilibrium of hydrogen sulfide absorption while slowing down the carbon dioxide absorption process, thereby improving the hydrogen sulfide selectivity of the process. Stream 21 is split into two portions, stream 22 and stream 2 at a flow rate of 600 GPM and 1800 GPM, respectively. Stream 22 is fed to the second absorber 52 while stream 2 is fed to absorber 51. It should be recognized that, depending on the sulfur content and other parameters, the split ratio between streams 2 and 22 may be adjusted, and typical flow volume of stream 2 is generally between 30% and 95% of stream 21 (with the balance of stream 21 being delivered to the second absorber as stream 22), more typically between 45% and 75%, and most typically between 55% and 65%.

The regenerator overhead vapor 9 is cooled in the overhead air-cooler 59 forming stream 13, which is separated in the reflux drum 60 forming a liquid stream 15 and a vapor stream 14. Stream 15, predominantly comprising water, is pumped by reflux pump 61 forming stream 16 as reflux to the regenerator. The enriched acid gas stream 14 is split into two portions, stream 17 and stream 18. Stream 17 is routed to a second absorber 52 for further enrichment and stream 18 is sent to a Claus unit (or other sulfur plant). The second absorber 52 is preferably operated under similar conditions as the first absorber to ensure optimal carbon dioxide and BTEX rejection. Therefore, in most preferred configurations, the overhead stream 23 of the second absorber 52 will be enriched in carbon dioxide (carbon dioxide concentration higher than in feed gas 1, typically at least 10% absolute, most typically at least 20% absolute) and be substantially depleted of hydrogen sulfide (less than 150 ppmv, preferably less than 120 ppmv, more preferably less than 100 ppmv, and most preferably less than 75 ppmv. Streams 23 and 3 can be combined to form stream 24, which may be sent to an acid gas incineration unit using the heating value of the rejected higher hydrocarbons and/or BTEX.

The volume of stream 17 is generally between about 15% to 90% of stream 14, and more preferably between about 25% to 75% of stream 14, and a particular volume will predominantly depend on the hydrogen sulfide concentration in the feed gas. For example, with a low hydrogen sulfide content feed gas 1, a higher flow volume in stream 17 (75%, and even higher) may be necessary. This volume can be reduced to about 25% (and even less) where the hydrogen sulfide concentration in the acid feed gas 1 is higher. In most feed gas compositions, enrichment to about 75% hydrogen sulfide can be achieved. In addition, it should be recognized that over 90% of the hydrocarbons and BTEX components are rejected by this process to the carbon dioxide vent streams. The hydrogen sulfide enrichment and the absence of BTEX in the enriched acid gas are greatly beneficial to the Claus unit.

Figure 2:
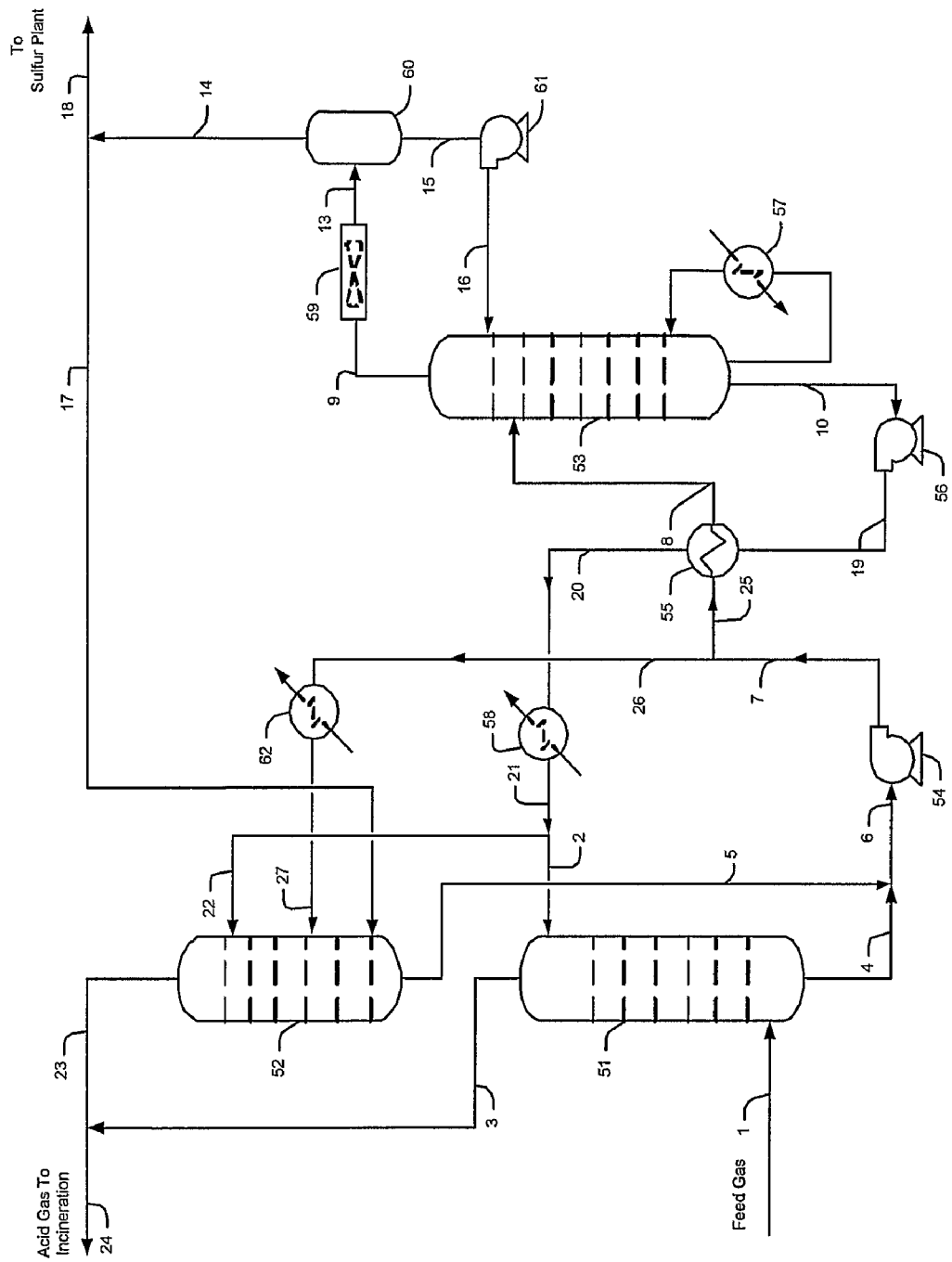
FIG. 2 is a second exemplary configuration for hydrogen sulfide enrichment from an acid gas comprising substantial quantities of carbon dioxide.

Another exemplary configuration in which the hydrogen sulfide enriched solvents from the first and second absorbers are combined, wherein one portion of the combined solvents is fed into and regenerated by the regenerator, and wherein another portion of the combined solvents is fed to the second absorber is depicted in FIG. 2 (with respect to like components, the same numerals and considerations as provided for FIG. 1 apply). Here, the rich solvent 4 from the amine absorber 51 is first combined with the rich solvent 5 from the second absorber 52 to form a combined rich solvent 6, which is split into two portions after solvent pump 54. Here, stream 7 from the rich solvent pump 54 is split into stream 25 and stream 26.

Stream 25, at a flow rate of 300 GPM to 400 GPM is cooled in cooler 62 to about 100° F. or lower and then routed to the lower section of the second absorber 52 as stream 27. With respect to the particular volume stream 25, it is generally contemplated that the actual volume may vary considerably, and will depend (among other factors) on the hydrogen sulfide concentration in the feed gas 1 and the overall solvent rate. However, stream 25 will typically be in the range of between about 25% and 85% of the volume of stream 7 (with the balance being provided as stream 26), and more typically between about 55% and 75%. It should be particularly noted that such configurations advantageously re-uses the semi-loaded rich solvent from the first absorber for further absorption in the second absorber. Consequently, it should be recognized that such configurations will reduce the overall solvent circulation, the regenerator size, and energy consumption. With respect to the remaining elements in FIG. 2, it should be appreciated that the configuration of FIGS. 1 and 2 are substantially identical. Table 1 and Table 2 summarize exemplary calculations for process performance for two different feed gas compositions (Table 1: 7% hydrogen sulfide, Table 2: 16% hydrogen sulfide) using the configuration as depicted in FIG. 2.

TABLE 1

| MOL. FRAC. | FEED GAS | CO2 | ENRICHED ACID GAS |
|---|---|---|---|
| Hydrogen sulfide | 0.070 | 0.000 | 0.751 |
| Carbon dioxide | 0.910 | 0.978 | 0.249 |
| C1 | 0.010 | 0.011 | trace |
| C2-C5 | 0.007 | 0.008 | trace |
| BTEX | 0.003 | 0.003 | trace |
| MMscfd | 50.00 | 45.34 | 4.66 |

TABLE 2

| MOL. FRAC. | FEED GAS | CO2 | ENRICHED ACID GAS |
|---|---|---|---|
| Hydrogen sulfide | 0.160 | 0.000 | 0.750 |
| Carbon dioxide | 0.820 | 0.974 | 0.250 |
| C1 | 0.010 | 0.013 | trace |
| C2-C5 | 0.007 | 0.009 | trace |
| BTEX | 0.003 | 0.0034 | trace |
| MMscfd | 50.00 | 39.34 | 10.66 |

Figure 3:
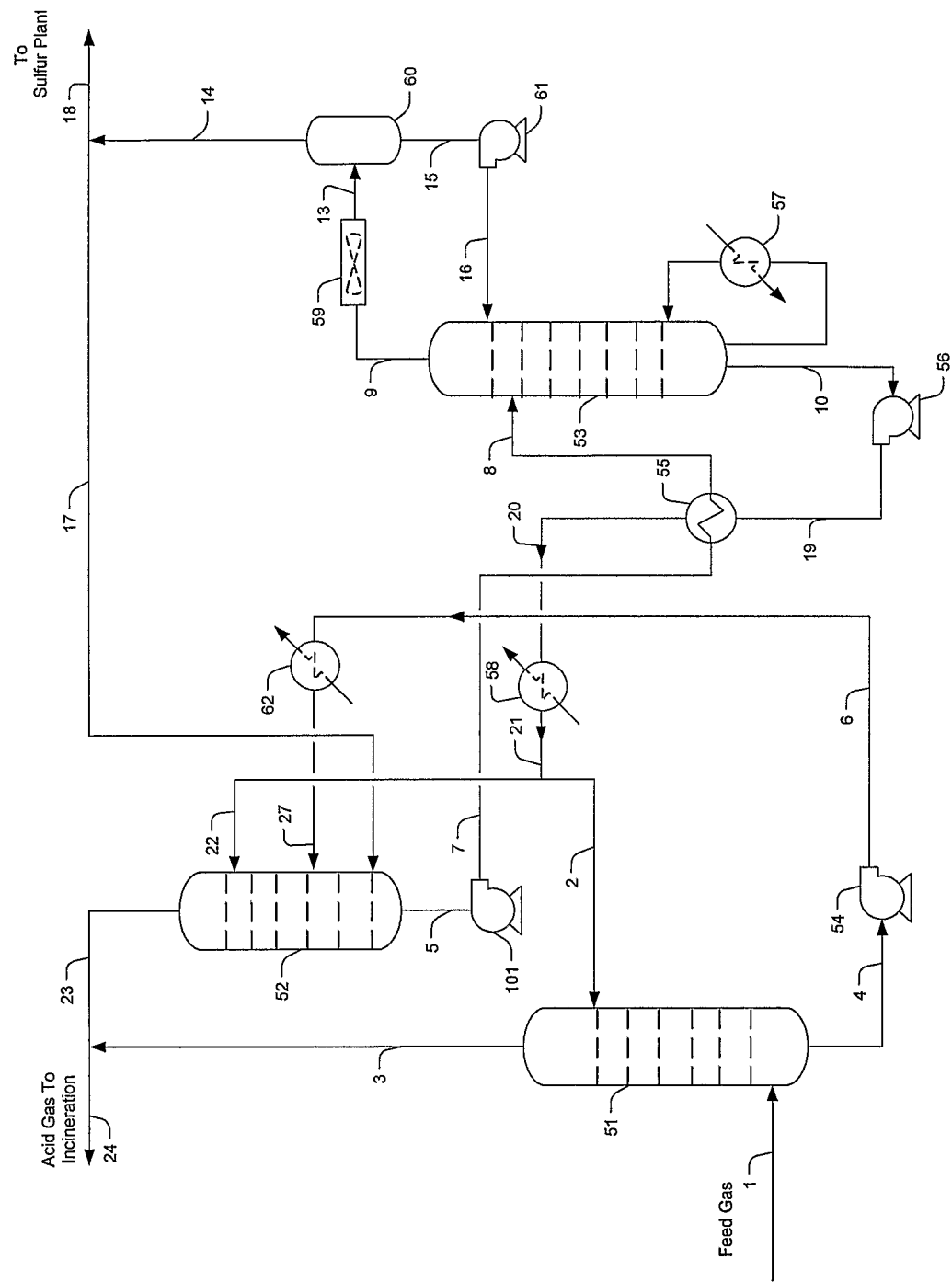
FIG. 3 is a third exemplary configuration for hydrogen sulfide enrichment from an acid gas comprising substantial quantities of carbon dioxide.

In yet another configuration in which the hydrogen sulfide enriched solvent from the first absorber is fed into the second absorber (preferably together with a lean solvent, albeit at a different position on the second absorber), and in the rich solvent from the second absorber is regenerated by the regenerator is depicted in FIG. 3 (with respect to like components, the same numerals and considerations as provided for FIG. 1 apply).

Here, feed gas stream 1, typically containing about 10% hydrogen sulfide, 89.9% carbon dioxide and 0.1% heavy hydrocarbons at 10 psig and 100° F., is first contacted by the lean solvent 2 in absorber 51 that produces a treated gas 3 with a low concentration of hydrogen sulfide (typically 200 ppmv, or less) suitable for incineration and a carbon dioxide saturated solvent 4. The high partial pressure of carbon dioxide (typically about 20-25 psia, most typically about 23 psia) and the relatively low partial pressure of hydrogen sulfide (typically less than 10 psia, more typically less than 5 psia, most typically about 2 psia) results in a bottom solvent 4 that is entirely or almost entirely saturated with carbon dioxide, but unsaturated with hydrogen sulfide. If such semi-rich solvent is regenerated, it will produce an acid gas that is high in carbon dioxide and low in hydrogen sulfide. In the configuration of FIG. 3, it should be recognized that the carbon dioxide loaded solvent from the first absorber is re-concentrated by rejecting the carbon dioxide content in the second absorber 52 using a portion of the hydrogen sulfide stream 17 as a stripping vapor.

The carbon dioxide loaded solvent stream 4 is pumped by pump 54 to stream 6 and cooled in cooler 62 prior to feeding to the mid section of second absorber 52 as stream 27. The hydrogen sulfide feed stream 17, typically about 70% hydrogen sulfide and 30% carbon dioxide is fed to the second absorber 52. Due to the high partial pressure of hydrogen sulfide (about 17.5 psia) and the low partial pressure of carbon dioxide (7.5 psia), the rich solvent from the second absorber stream 5 is enriched in hydrogen sulfide. In the second absorber, the lean amine stream 22 is fed to the top tray producing an acid gas stream that contains a very low level of hydrogen sulfide suitable for incineration. It should be appreciated that cooler 62 advantageously allows the second absorber to operate at a lower temperature (which will further improve the absorption of hydrogen sulfide and rejection of carbon dioxide in the second absorber).

The hydrogen sulfide loaded solvent from the second absorber stream 5 is pumped by pump 101 forming stream 7 and is routed to the regenerator 53 via the conventional lean/rich exchanger 55. It should also be appreciated that the heavy hydrocarbons co-absorbed in the carbon dioxide loaded solvent from the first absorber are typically over 90% rejected in the second absorber 52. An acid gas depleted of heavy hydrocarbons will allow the sulfur plant to operate more effectively avoiding catalyst deactivation. In addition, the heating value content in the rejected hydrocarbons will reduce the fuel consumption in the incinerator using combined absorber overhead stream 24. With respect to the remaining elements in FIG. 3, it should be appreciated that the configuration of FIGS. 1 and 3 are substantially identical.

In still further configurations, it is further contemplated that in plants without an integrated Claus plant, the acid gas stream 17 in the split-flow configuration may be divided into two streams, wherein one portion is combined with feed gas stream and fed to the first absorber (or fed to the bottom of the first absorber) while another portion of the acid gas stream 17 is optionally fed to the bottom of a second (or third absorber). Recycling of at least a portion of the acid gas stream to the feed gas is particularly advantageous to further enhance the hydrogen sulfide content in the enriched gas stream. Moreover, it should be recognized that such configurations may be especially useful where the flow of feed gas is variable with varying hydrogen sulfide content.

In each of the above configurations it is generally contemplated that the hydrogen sulfide rich stream 14 can be split into various fractions to produce streams 17 and 18, and a particular volume of stream 17 will predominantly depend on the hydrogen sulfide and/or carbon dioxide content of stream 14. Generally, recycle stream 17 will have a volume of about 0% to 90% of the volume of stream 14, more typically about 10%-70%, and most typically between about 25% and 60%.

Contemplated Plants with Sulfur Plant Integration

Where it is desired that a Claus plant (or other sulfur plant that produces elemental sulfur from at least a portion of the acid gas stream 14) is integrated into contemplated configurations, it is generally preferred that the Claus plant or other plant receives at least part of the hydrogen sulfide-rich stream 14 and provides a tail gas to contemplated configurations. Thus, suitable plants will have sulfur output only via elemental sulfur production of the Claus plant and an overhead gas containing residual hydrogen sulfide at a level of less than 150 ppmv.

In such configurations, the inventors discovered that combinations of an enrichment unit and a third absorber processing the tail gas from the Claus unit can effectively achieve a 99.7% or higher sulfur recovery with significantly reduced equipment. Depending on the integration of the third absorber, various configurations may be achieved. However, it is generally preferred that the overhead product is enriched in carbon dioxide while having a hydrogen sulfide content of less than 150 ppmv (substantially depleted of hydrogen sulfide). With respect to the use of the hydrogen sulfide-enriched solvent from the first, second, and third absorbers, various options may be realized and exemplary configurations are depicted below.

Figure 4:
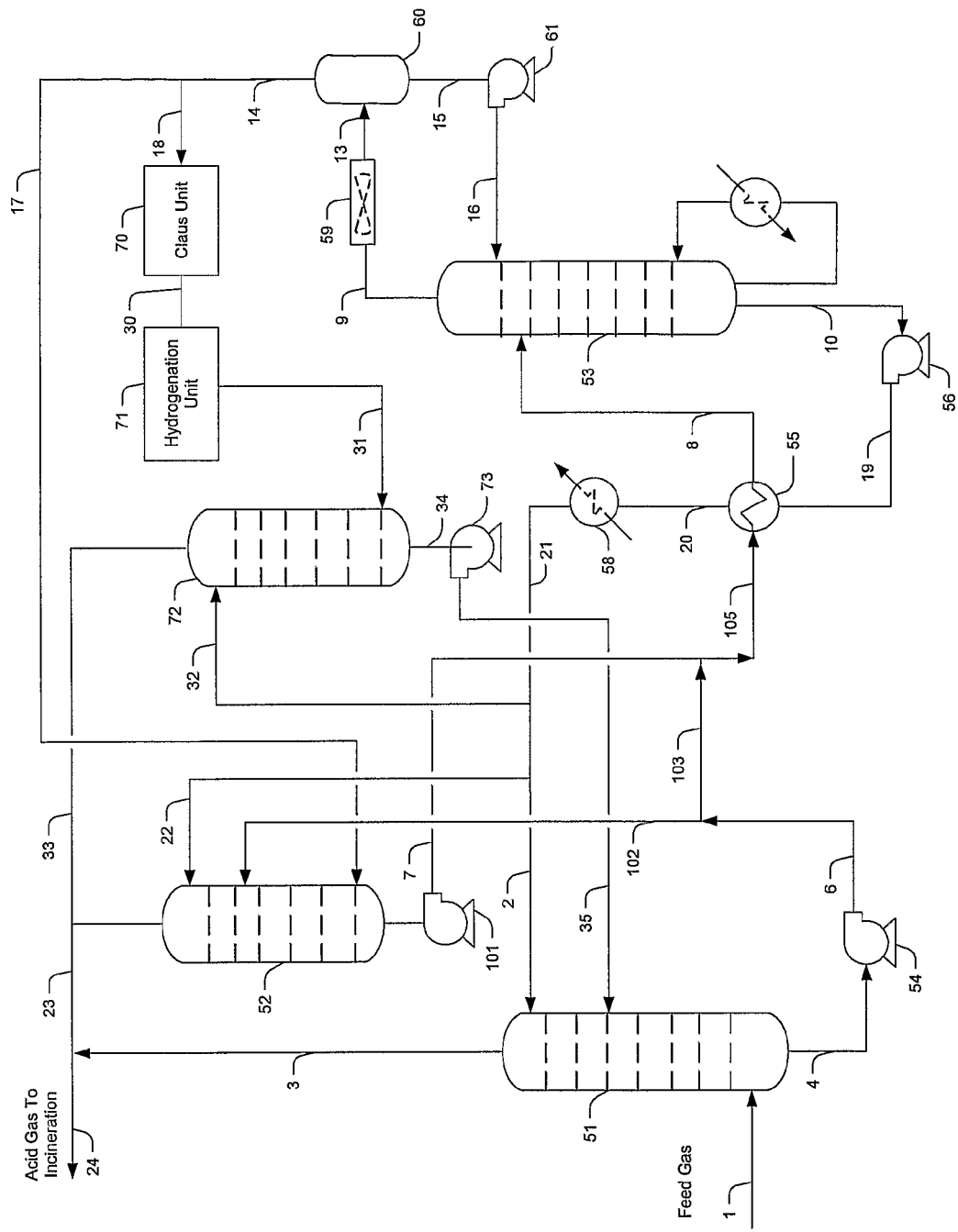
FIG. 4 is a fourth exemplary configuration for hydrogen sulfide enrichment from an acid gas comprising substantial quantities of carbon dioxide in which a Claus plant is integrated.

For example, as depicted in FIG. 4, the hydrogen sulfide-enriched solvent 34 from the third absorber 72 may be fed to the mid section of the first absorber 51 as semi-lean solvent stream 35 via solvent pump 73, which together with lean solvent 2 being fed to the top of absorber 51 will absorb hydrogen sulfide to produce a treated gas depleted in H2S. Two-stage Claus reactor system 70 is used to process enriched acid gas stream 18. It should be appreciated that a conventional sulfur plant without a tail gas treatment option would typically require four-stage Claus reactors equipped with special burner design, highly reactive catalysts, and additional processing steps in order to achieve desirable BTEX destruction and 99% sulfur recovery. In contrast, contemplated integrated tail gas absorption configurations significantly reduce overall cost as compared to conventional plants.

In contemplated configurations, the effluent gas from the Claus unit (stream 30), typically comprising trace quantities of sulfur oxides and unconverted hydrogen sulfide, is processed in a hydrogenation and quench unit 71. The quenched hydrogenated gas 31 is scrubbed in the third absorber 72 using lean amine stream 32 that is supplied by regenerator 53. The third absorber is preferably configured and operated such that the overhead vapor stream 33 comprises carbon dioxide and is substantially depleted of hydrogen sulfide.

The rich amine stream 34 from the third absorber is pumped by amine pump 73 forming stream 35 which is then used as a semi-lean solvent that is routed to the mid section of the first absorber 51 for re-absorption. The first absorber produces overhead stream 3, comprises carbon dioxide and is substantially depleted of hydrogen sulfide (and may be combined with stream 23 to form stream 24 for incineration). The rich amine stream 4 from the first absorber 51 is pumped by pump 54 forming stream 6 that is either further reused in the second absorber 52 (receiving lean solvent 22) via stream 102, and/or sent to the exchanger 55 in stream 103. The volume of stream 102 typically varies from 10% to 90% of the volume of stream 6, and the particular volume will depend on the composition of feed gas 1. Hydrogen sulfide enriched stream 7 from the second absorber (via pump 101) is combined with stream 103 to form combined stream 105 that is heated in the lean/rich exchanger 55 and fed to the common regenerator as stream 8. The regenerator 53 provides lean solvent 10 to the first, second, and third absorbers via pump 56 and stream 19, exchanger 55/stream 20 and cooler 58/stream 21. Regenerator overhead stream 9 is cooled in cooler 59, and water is condensed from cooled overhead stream 13 and returned to the regenerator via separator 60, stream 15, pump 61 and stream 16. The hydrogen sulfide-rich overhead product 14 is then split into recycling stream 17 and Claus plant feed stream 18.

Figure 5:
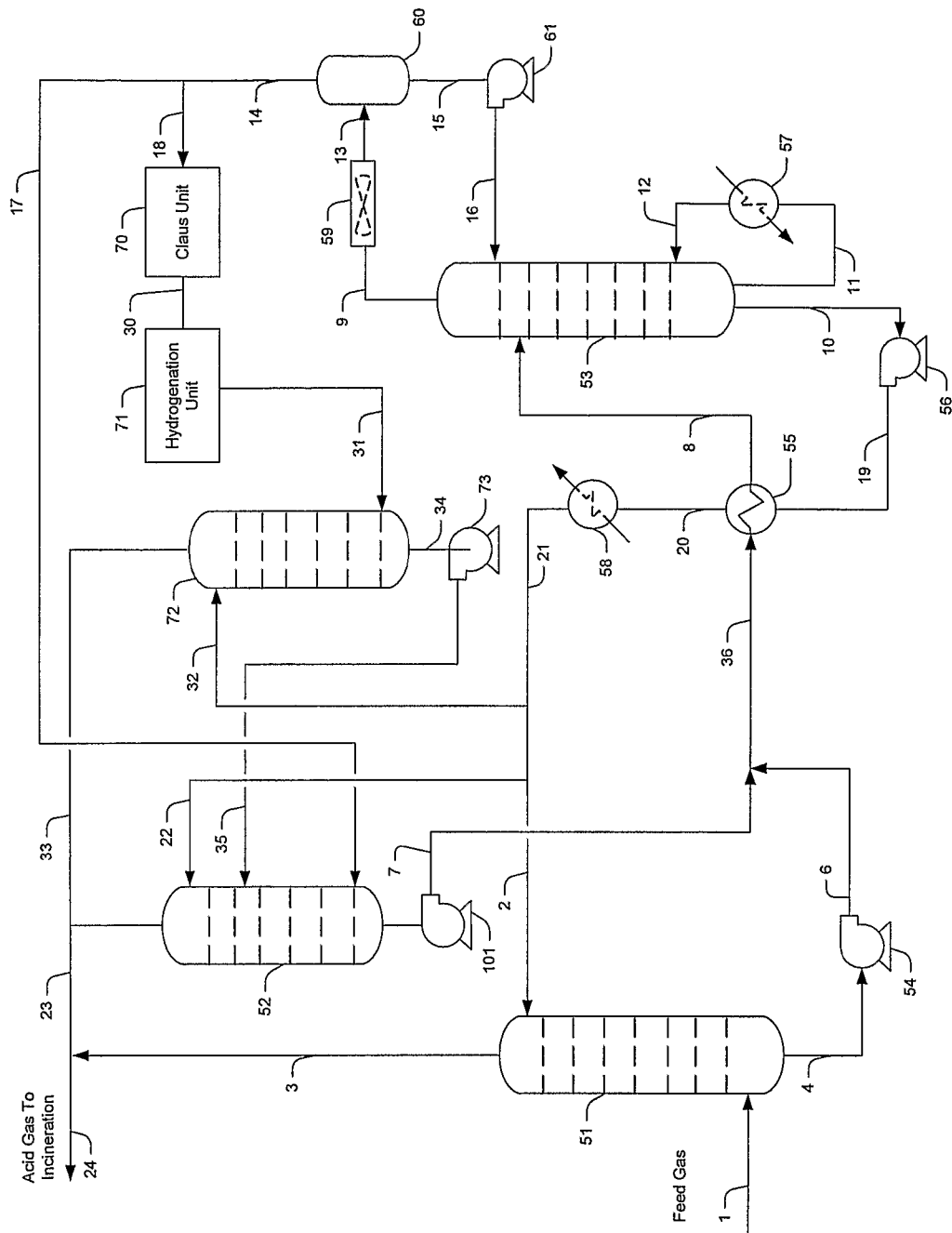
FIG. 5 is a fifth exemplary configuration for hydrogen sulfide enrichment from an acid gas comprising substantial quantities of carbon dioxide in which a Claus plant is integrated.

Alternatively, as depicted in FIG. 5, the semi-lean solvent from the third absorber 72 is re-used in the second absorber 52 by feeding the semi-lean solvent 35 to the mid section of the second absorber 52. In such configurations, the hydrogen sulfide enriched solvent from the first absorber need not be routed to the second absorber, but can be combined with the hydrogen sulfide enriched solvent from the second absorber prior to entry in the regenerator 53. Using such configurations, it should be appreciated that the total solvent circulation and regeneration duty may be significantly reduced, resulting in lower capital and operating costs of the plant. With respect to the remaining components of the configuration in FIG. 5, the same considerations as for corresponding elements of the configuration in FIG. 4 apply.

Figure 6:
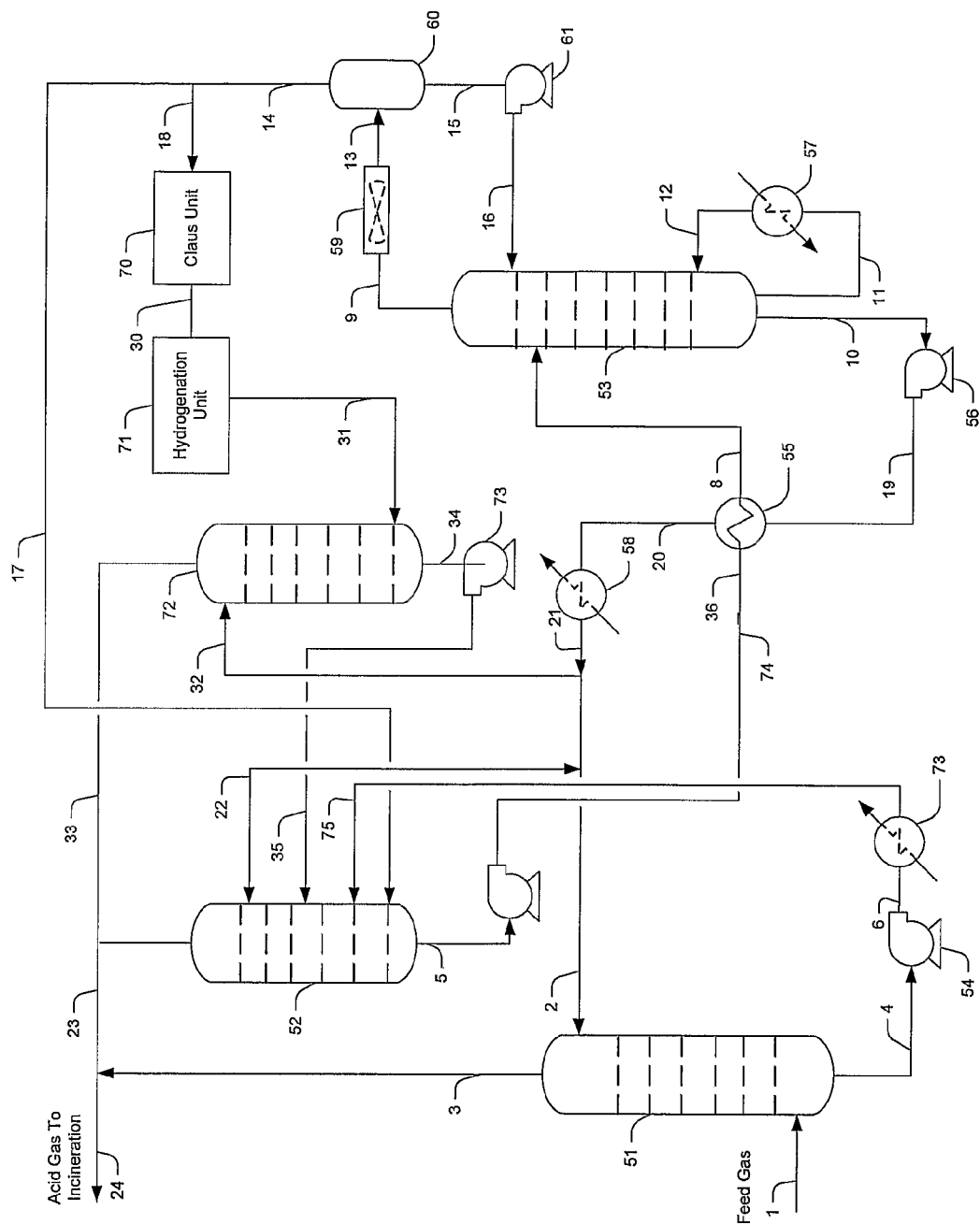
FIG. 6 is a sixth exemplary configuration for hydrogen sulfide enrichment from an acid gas comprising substantial quantities of carbon dioxide in which a Claus plant is integrated.

In yet another contemplated configuration, as shown in FIG. 6, a portion of the carbon dioxide loaded semi-lean solvent stream 4 from the first absorber 51 is pumped via pump 54 forming stream 6. This carbon dioxide loaded semi-lean solvent is cooled in a cooler 73 to about 100° F. or lower forming stream 75, which is then routed to the lower section of the second absorber 52. Similar to the configuration of FIG. 5 above, the semi-lean solvent 35 from the third absorber 72 is re-used in the second absorber 52 by feeding the semi-lean solvent 35 to the mid section of the second absorber 52. Such configuration further improves the solvent selectivity and rejection of carbon dioxide, resulting in additional reduction in solvent circulation and regeneration duties. Again, and with respect to the remaining components of the configuration in FIG. 6, the same considerations as for corresponding elements of the configuration in FIG. 5 apply.

Figure 7:
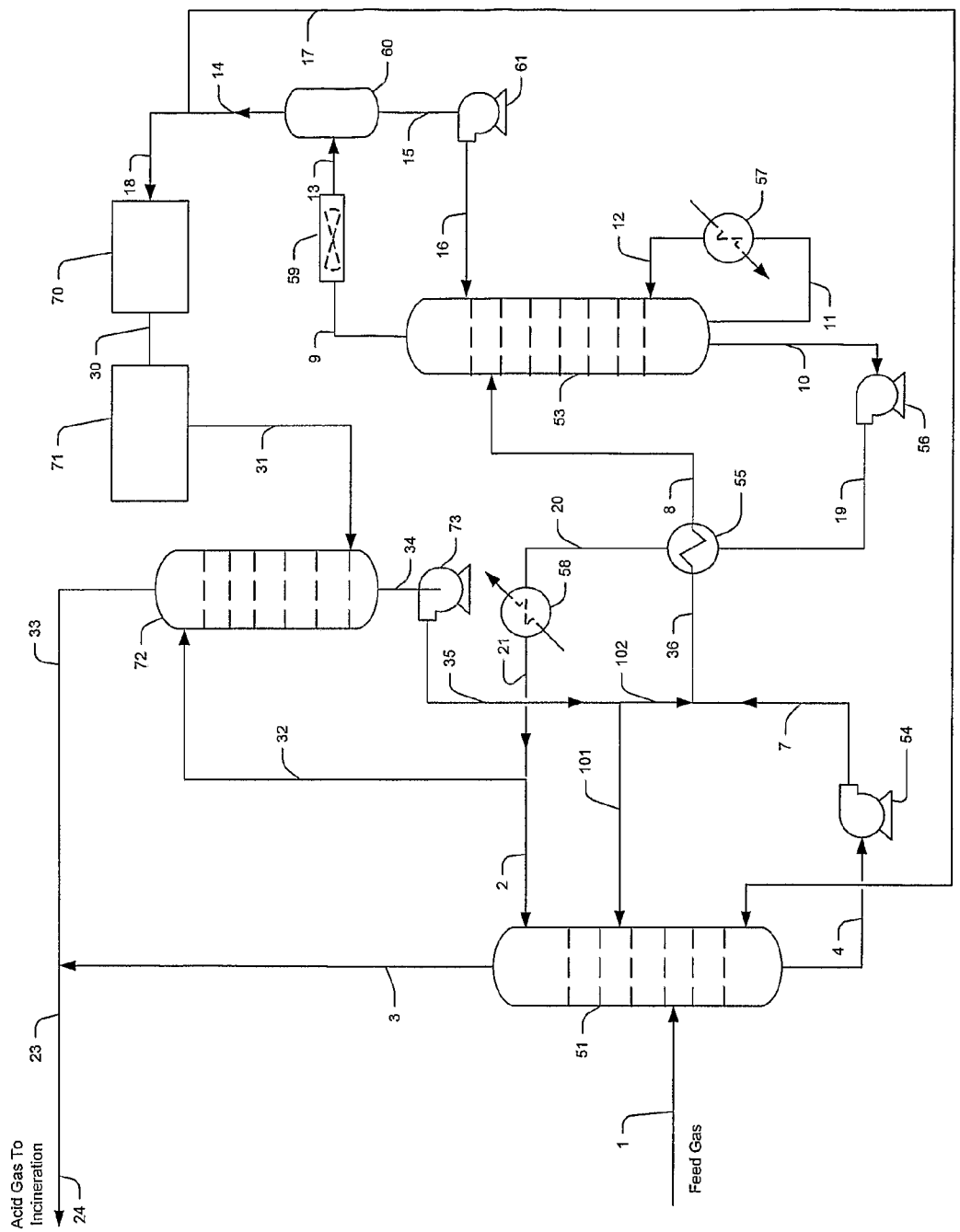
FIG. 7 is a seventh exemplary configuration for hydrogen sulfide enrichment from an acid gas comprising substantial quantities of carbon dioxide in which a Claus plant is integrated.

In still further contemplated configurations with an integrated Claus plant as depicted in FIG. 7, the hydrogen sulfide rich stream 14 from the regenerator 53 is split into two portions, wherein the first portion is fed to the Claus plant 70 and Hydrogenation/Quench Unit 71, and wherein the tail gas from the Hydrogenation/Quench Unit is fed to the bottom of the third absorber 72 as previously described. The second portion of the hydrogen sulfide rich stream 14 (stream 17) is directly fed to the bottom of the first absorber 51, which further receives in the mid section the hydrogen sulfide enriched solvent from the third absorber 72. The hydrogen sulfide rich solvent from the first absorber is then regenerated in the regenerator 53 as previously described. By using such configurations, it should be recognized that the second absorber (previously receiving stream 17) can be eliminated.

Thus, it should be particularly appreciated that configurations according to the inventive subject matter will produce an acid gas enriched in hydrogen sulfide from a lean hydrogen sulfide stream, wherein the acid gas can be enriched from about 7% to about 75% hydrogen sulfide. Moreover, preferred configurations allow removal of hydrocarbons and BTEX components that are known to interfere with sulfur plant operation. Still further, it should be recognized that contemplated configurations will produce a carbon dioxide stream with low hydrogen sulfide content (typically less than 150 ppmv) suitable for disposal in incinerators. Alternatively, the carbon dioxide stream may also be employed for enhanced oil recovery or as diluent in a gas turbine.

Furthermore, otherwise necessary stages of Claus reactors (typically at least two) can be eliminated using the configurations presented herein, which substantially reduces overall plant cost. Contemplated configurations also solve the problems of low hydrogen sulfide content and lower heating content in the acid feed gas where the hydrogen sulfide is diluted. Thus, difficulties associated with fuel gas firing for the Claus reaction and BTEX destruction are eliminated. With respect to integration of contemplated plants, it should be appreciated that numerous plants producing acid gases with low hydrogen sulfide content are suitable and include various gas plants, sulfur plants, Gas-to-Liquid conversion plants, gasification plants, IGCCs, enhanced oil recovery plants, and various existing facilities that are retrofitted to meet more stringent emission requirements.

Thus, specific embodiments and applications of acid gas enrichment and sulfur recovery have been disclosed. It should be apparent, however, to those skilled in the art that many more modifications besides those already described are possible without departing from the inventive concepts herein. The inventive subject matter, therefore, is not to be restricted except in the spirit of the present disclosure. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
   a first absorber fluidly coupled to a regenerator, wherein the first absorber is configured to promote absorption of hydrogen sulfide by a hydrogen sulfide-selective solvent, and wherein the regenerator is configured to promote formation of a hydrogen sulfide-rich gas from the hydrogen sulfide-selective solvent;
   a second absorber fluidly coupled to the regenerator, wherein a portion of the hydrogen sulfide-rich gas is fed to the second absorber to thereby increase a hydrogen sulfide concentration in the hydrogen sulfide-rich gas;
   wherein the first and second absorbers are configured to produce an overhead product that is enriched in carbon dioxide and substantially depleted in hydrogen sulfide;
   wherein another portion of the hydrogen sulfide-rich gas is fed to a Claus plant, and further comprising a third absorber that receives a tail gas from the Claus plant, wherein the third absorber is configured to promote absorption of hydrogen sulfide by a hydrogen sulfide-selective solvent; and
   wherein the third absorber is configured to produce an overhead product that is enriched in carbon dioxide and substantially depleted in hydrogen sulfide.

2. The plant of claim 1 wherein the first and second absorbers produce a first and second hydrogen sulfide-enriched solvent, and wherein the first and second hydrogen sulfide-enriched solvents are combined.

3. The plant of claim 1 wherein the first and second absorbers produce a first and second hydrogen sulfide-enriched solvent, wherein the first and second hydrogen sulfide-enriched solvents are combined, and wherein the second absorber receives at least a portion of the combined hydrogen sulfide-enriched solvents.

4. The plant of claim 1 wherein the first absorber produces a first hydrogen sulfide-enriched solvent, and wherein the second absorber receives at least a portion of the first hydrogen sulfide-enriched solvent.

5. The plant of claim 1 wherein the third absorber is configured to produce a third hydrogen sulfide-enriched solvent.

6. The plant of claim 5 wherein the third hydrogen sulfide-enriched solvent is fed to at least one of first and second absorbers.

7. A plant comprising:
   a first absorber fluidly coupled to a regenerator, wherein the first absorber is configured to promote absorption of hydrogen sulfide by a hydrogen sulfide-selective solvent, and wherein the regenerator is configured to promote formation of a hydrogen sulfide-rich gas from the hydrogen sulfide-selective solvent;
   a second absorber fluidly coupled to the regenerator, wherein a portion of the hydrogen sulfide-rich gas is fed to the first absorber to thereby increase a hydrogen sulfide concentration in the hydrogen sulfide-rich gas;
   a Claus plant that receives another portion of the hydrogen sulfide-rich gas and produces a tail gas, wherein the second absorber is configured to receive the tail gas; and wherein the first and second absorbers are configured to produce an overhead product that is enriched in carbon dioxide and substantially depleted in hydrogen sulfide.

8. The plant of claim 7 wherein the second absorber is configured to produce a hydrogen sulfide-enriched solvent, and wherein at least a portion of the hydrogen sulfide-enriched solvent is fed to the first absorber.

9. A method of increasing the concentration of hydrogen sulfide in a gas stream comprising:

separating an acid gas stream in a first absorber to form a first carbon dioxide-rich gas and a first hydrogen sulfide-enriched solvent using a hydrogen sulfide-selective solvent;

separating a first portion of a hydrogen sulfide-rich regenerator overhead product gas in a second absorber to form a second carbon dioxide-rich gas and a second hydrogen sulfide-enriched solvent;

combining the first and second hydrogen sulfide-enriched solvents to form a combined stream that is fed to a regenerator;

removing in the regenerator hydrogen sulfide from the first and second hydrogen sulfide-enriched solvents to thereby form the hydrogen sulfide-rich regenerator overhead product gas, the first portion of which is fed to the second absorber; and feeding a second portion of the hydrogen sulfide-rich product gas to a Claus plant.

10. The method of claim 9 wherein the step of combining the first and second hydrogen sulfide-enriched solvents comprises mixing of the first and second hydrogen sulfide-enriched solvents.

11. The method of claim 9 wherein the step of combining the first and second hydrogen sulfide-enriched solvents comprises feeding at least part of the first hydrogen sulfide-enriched solvent into the second absorber.

12. The method of claim 11 wherein the Claus plant produces a tail gas, and comprising a step of feeding the tail gas to a third absorber that produces a third overhead product that is enriched in carbon dioxide and substantially depleted in hydrogen sulfide, and a third hydrogen sulfide-enriched solvent.

13. The method of claim 12 wherein the third hydrogen sulfide-enriched solvent is fed to the first absorber.

14. The method of claim 12 wherein the third hydrogen sulfide-enriched solvent is fed to the second absorber.

* * * * *